United States Patent Office 2,942,946
Patented June 28, 1960

2,942,946

METHOD OF PREPARING HYDROGEN CYANIDE FROM OXAMIDE AND AMMONIUM OXALATE

William L. Fierce, Crystal Lake, and Walter J. Sandner, Carpentersville, Ill., assignors to The Pure Oil Company, Chicago, Ill., a corporation of Ohio No Drawing. Filed Aug. 4, 1958, Ser. No. 753,146

5 Claims. (Cl. 23—151)

This invention relates to new and useful improvements in processes for the preparation of hydrogen cyanide and more particularly to a process in which hydrogen cyanide is produced by the catalytic thermal decomposition of oxamide or ammonium oxalate.

Hydrogen cyanide is used commercially as a fumigant and has had extensive use in research laboratories both as a reagent and as a non-aqueous solvent. The classical procedure for preparation of hydrogen cyanide involves the reaction of metal cyanides, such as sodium or potassium cyanide, with dilute sulfuric acid. Hydrogen cyanide is made commercially by the catalytic partial oxidation of a mixture of ammonia and methane. In many research laboratories, there is a need for a procedure for preparing hydrogen cyanide from non-poisonous materials which would avoid the necessity of using metal cyanide salts. Similarly, in the fumigation art, there is a need for a method of generating hydrogen cyanide in situ which does not require the use of poisonous cyanide salts or the handling of containers of hydrogen cyanide which presents the possibility of leakage of this very poisonous gas.

It is therefore a principal object of this invention to provide a method of preparation of hydrogen cyanide by decomposition of relatively non-toxic reagents.

A feature of this invention is the provision of a process for preparation of hydrogen cyanide by the thermal, catalytic decomposition of oxamide or ammonium oxalate in the presence of a very small proportion of phosphorus pentoxide.

Other objects and features of this invention will become apparent from time to time throughout the specification and claims as hereinafter related.

This invention is based upon our discovery that when oxamide or ammonium oxalate is heated to a temperature in the range of about 250–500° C. in the presence of 1–50 mol percent of phosphorus pentoxide, hydrogen cyanide is generated as a major product. D. T. Mowry, in Chemical Reviews, 42, 258, (1948), in a review on the preparation of nitriles states that cyanogen can be prepared by the heating of oxamide with an eight-fold amount of phosphorus pentoxide at 120°–160° C. This work was originally done by C. Bertagnini, Ann., 104, 176 (1857). In Joffe and Beckham, U.S. Patent 2,646,-448, it is reported that ammonium oxalate was heated with phosphorus pentoxide at temperatures below 200° C. to produce oxamide. Under the conditions of their process, temperatures above 200° C. are reported to produce competing reactions in which carbon dioxide, carbon monoxide, and ammonia are produced. In neither of these references (or in any other known prior art) is there found any suggestion that the pyrolysis of ammonia oxalate or oxamide in the presence of a small proportion of phosphorus pentoxide at a temperature in the range of about 250°–500° C. would produce hydrogen cyanide as a major product instead of cyanogen.

In carrying out this invention, ammonium oxalate or oxamide is mixed with a small proportion, 1–50 mol percent, preferably 1–10 mol percent, of phosphorus pentoxide and heated to a temperature in the range of about 250°–500° C., preferably about 270°–350° C., to generate a mixture of reaction products, including hydrogen cyanide as a major product.

The following non-limiting examples are illustrative of the manner in which this invention is carried out and the scope of the invention.

EXAMPLE I

A series of runs were carried out in which finely powdered ammonium oxalate and phosphorus pentoxide were intimately mixed in the dry state and heated in a glass tube inserted in an electrically-heated aluminum block. A stream of nitrogen was passed over the dry mass to pick up any evolved gases, and the gas stream was analyzed by the mass spectrometer to identify the various gaseous products. The gas stream was also passed through an aqueous caustic soda solution and the solution titrated with a standard silver nitrate solution for determination of cyanide ion. The mass spectrometer showed that the effluent gases contained hydrogen cyanide, methane, ammonia, water, and carbon dioxide. No cyanogen was present. The titration for cyanide ion therefore was calculated on the basis of hydrogen cyanide as the product and yields are calculated as being based upon the amount of ammonium oxalate charged. In Table I, there are shown the results of eight runs using different proportions of ammonium oxalate and phosphorus pentoxide and different temperatures and times of heating.

*Table 1*

CATALYTIC, THERMAL DECOMPOSITION OF AMMONIUM OXALATE

| Run No. | g. Ammonium oxalate | g. $P_2O_5$ | Hours heated | Temp. (° C.) | Weight Ratio Oxalate/$P_2O_5$ | Percent Yield of HCN [1] |
|---|---|---|---|---|---|---|
| A | 1.08 | 9.67 | 4.25 | 340.5 | 0.11 | 0.0 |
| B | 2.68 | 0.66 | 3.0 / 4.5 | 185 / 315.5 | 4.07 | 26.4 |
| C | 3.66 | 0.89 | 3.5 / 3.0 | 185 / 340.5 | 4.11 | 25.6 |
| D | 1.05 | 0.088 | 3.75 / 2.75 | 185 / 340.5 | 11.9 | 32.6 |
| E | 1.02 | 0.086 | 2.75 | 340.5 | 11.9 | 25.3 |
| F | 1.12 | 0.120 | 6.5 | 340.5 | 9.35 | 20.6 |
| G | 1.03 | 0.077 | 4.0 / 2.75 | 185 / 340.5 | 13.4 | 34.0 |
| H | 1.00 | 0.037 | 4.0 / 1.75 | 185 / 340.5 | 27.0 | 28.0 |
| I | 1.01 | 0.00 | 4.0 / 1.75 | 185 / 340.5 | -------- | 1.7 |

[1] HCN yields are based upon the moles of ammonium oxalate charged.

From the tabulated data on the several runs reported in Table I, it is seen that when ammonium oxalate is heated with an excess of phosphorus pentoxide, no hydrogen cyanide is obtained. On the other hand, when ammonium oxalate is heated with a very small proportion of phosphorus pentoxide, hydrogen cyanide is obtained in yield varying from about 21 to 35%.

EXAMPLE II

In another series of runs, finely powdered oxamide was intimately mixed with phosphorus pentoxide and heated in a glass tube in an electrically-heated aluminum block. Nitrogen was passed over the mixture and gas samples were analyzed by mass spectrometer; the gases also were absorbed in aqueous alkali and titrated to determine the amount of cyanide ion present. As in Example I, the pyrolysis of oxamide produced a mixture of hydrogen cyanide, methane, ammonia, carbon dioxide, and water, but no cyanogen, under the conditions of this process.

In one run, 25.0 g. of oxamide and 5.0 g. of phosphorus pentoxide were heated to a temperature of 282° C. for a period of slightly more than 6 hours. A yield of 14.8 mol percent hydrogen cyanide was obtained, based on the amount of oxamide charged.

In another run, 5.2 g. of oxamide and 1.06 g. of phosphorus pentoxide were heated to 340° C. for a period of slightly over 10 hours. In this run, a yield of 36.4 mol percent of hydrogen cyanide was obtained. As was pointed out above, the prior art would indicate that the heating of oxamide with an excess of $P_2O_5$ under these reaction conditions should produce cyanogen as the product rather than hydrogen cyanide.

The precise mechanism for the formation of hydrogen cyanide from ammonium oxalate or from oxamide is not known, although several equations can be written which would yield hydrogen cyanide as a product. For example, a balanced equation can be written for the thermal decomposition of oxamide into one mol of water, one mol of hydrogen cyanide, and one mol of cyanic acid. An equation can also be written for the thermal decomposition of oxamide into hydrogen cyanide, ammonia, and carbon dioxide. Similar equations can be written for the decomposition of ammonium oxalate. While the reaction mechanism is unknown, this lack of knowledge does not negate the fact that the reaction does proceed as described and that we have, in fact, discovered a novel and useful method for the generation of hydrogen cyanide from non-toxic materials.

While we have described our invention fully and completely, with special emphasis upon several preferred embodiments thereof, as required by the patent statutes, we wish it understood that within the scope of the appended claims this invention may be practiced otherwise than as specifically described.

What is claimed is:

1. A method of preparing hydrogen cyanide which comprises heating a compound of the group consisting of oxamide and ammonium oxalate with about 1–50 mol percent of phosphorus pentoxide to a temperature of 250°–500° C. to produce a gaseous effluent containing hydrogen cyanide.

2. A method of preparing hydrogen cyanide which comprises heating oxamide with about 1–10 mol percent of phosphorus pentoxide to a temperature of about 270°–350° C. to produce a gaseous effluent containing hydrogen cyanide.

3. A method of producing hydrogen cyanide which comprises heating oxamide with about 5–10 mol percent of phosphorus pentoxide at about 340° C. to produce a gaseous effluent containing hydrogen cyanide.

4. A method of preparing hydrogen cyanide which comprises heating ammonium oxalate with about 1–10 mol percent of phosphodus pentoxide to a temperature of about 270°–350° C. to produce a gaseous effluent containing hydrogen cyanide.

5. A method of preparing hydrogen cyanide which comprises heating ammonium oxalate with about 5–10 mol percent of phosphorus pentoxide to a temperature of about 340° C. to produce a gaseous effluent containing hydrogen cyanide.

References Cited in the file of this patent

UNITED STATES PATENTS

| | | |
|---|---|---|
| 1,712,297 | Fick | May 7, 1929 |
| 2,646,448 | Joffe et al. | July 21, 1953 |

OTHER REFERENCES

Williams: "Cyanogen Compounds," Edward Arnold and Co., London 2nd ed. 1948, pages 3 and 4.

Robertson and Pearce: "The Kinetics of the Thermal Reaction Between Hydrogen and Cyanogen," Journal of the American Chemical Society, vol. 64, 1942, pp. 1880–1886.